(12) United States Patent
Leff et al.

(10) Patent No.: US 10,156,454 B2
(45) Date of Patent: Dec. 18, 2018

(54) GPS NAVIGATION

(71) Applicant: International Business Machines Corporation, Armonk, NY (US)

(72) Inventors: Avraham Leff, Spring Valley, NY (US); James T. Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 14/944,383

(22) Filed: Nov. 18, 2015

(65) Prior Publication Data

US 2017/0138755 A1 May 18, 2017

(51) Int. Cl.
*G01C 21/00* (2006.01)
*G01C 21/34* (2006.01)
*G01S 19/38* (2010.01)

(52) U.S. Cl.
CPC .......... *G01C 21/3492* (2013.01); *G01S 19/38* (2013.01)

(58) Field of Classification Search
None
See application file for complete search history.

(56) References Cited

U.S. PATENT DOCUMENTS

| | | | |
|---|---|---|---|
| 5,913,917 A * | 6/1999 | Murphy | B60R 16/0232 701/123 |
| 7,512,487 B1 * | 3/2009 | Golding | G01C 21/36 701/424 |
| 8,788,232 B2 | 7/2014 | Suzuno | |
| 9,026,368 B2 * | 5/2015 | Fujimoto | G01C 21/3676 340/995.2 |
| 9,044,171 B2 | 6/2015 | Venkatraman et al. | |
| 2001/0027375 A1 | 10/2001 | Machida et al. | |
| 2004/0030670 A1 * | 2/2004 | Barton | G01C 21/32 |

(Continued)

FOREIGN PATENT DOCUMENTS

| | | |
|---|---|---|
| JP | 2004028651 A | 1/2004 |
| JP | 2014062808 A | 4/2014 |
| WO | 2010063904 A1 | 6/2010 |

OTHER PUBLICATIONS

Valera et al., "Driving cycle and road grade on-board predictions for the optimal energy management in EV-PHEVs", EVS27 International Battery, Hybrid and Fuel Cell Electric Vehicle Symposium, Nov. 17-20, 2013, Barcelona, Spain, pp. 1-10.

*Primary Examiner* — Truc M Do
(74) *Attorney, Agent, or Firm* — Kristofer L. Haggerty

(57) ABSTRACT

A computer detects the receipt of a destination and mode of transportation from a user. The computer determines potential routes to the destination using static map information and splits the routes into shorter lengths known as segments. The computer determines a commute time for each of the segments based on static map information, known as a static segment commute time, and determines whether any of the segments have been previously commuted by the user. If so, the computer replaces the static segment commute times with the segment commute times recorded during previous commutes of the segment, known as habitual segment commute times. The computer then determines the total commute time of each potential route based on the static and habitual segment commute times and records additional habitual segment statistics as the user commutes the selected route.

15 Claims, 3 Drawing Sheets

(56) References Cited

U.S. PATENT DOCUMENTS

| | | | | |
|---|---|---|---|---|
| 2004/0225437 A1* | 11/2004 | Endo | G01C 21/34 | 701/415 |
| 2007/0112475 A1* | 5/2007 | Koebler | B60L 3/12 | 701/1 |
| 2007/0275700 A1* | 11/2007 | Agrawal | G06Q 10/109 | 455/414.1 |
| 2008/0004802 A1* | 1/2008 | Horvitz | G01C 21/3415 | 701/533 |
| 2008/0228396 A1* | 9/2008 | Machii | G01C 21/32 | 701/533 |
| 2009/0088973 A1* | 4/2009 | Watkins | G01C 21/3691 | 701/469 |
| 2009/0182492 A1* | 7/2009 | Alten | G01C 21/3484 | 701/532 |
| 2011/0246055 A1* | 10/2011 | Huck | G01C 21/3484 | 701/533 |
| 2011/0307166 A1* | 12/2011 | Hiestermann | G01C 21/32 | 701/119 |
| 2011/0313647 A1* | 12/2011 | Koebler | B60L 15/2045 | 701/123 |
| 2013/0073113 A1* | 3/2013 | Wang | B60K 6/445 | 701/1 |
| 2013/0110392 A1* | 5/2013 | Kosseifi | G01C 21/3415 | 701/410 |

* cited by examiner

GPS NAVIGATION

TECHNICAL FIELD

The present invention relates generally to global positioning system (GPS) navigation, and more particularly to improving estimated commute times when a user is without access to external traffic information providers.

BACKGROUND

GPS navigation is extremely useful in estimating commute times and estimating the quickest route to reach a destination. Typically, GPS navigation modules calculate a route and commute time by accessing both static map information which details the streets, speed limits, and the mileage between locations, as well as dynamic map information which details the current and anticipated traffic conditions. While a static map may be downloaded onto a device similar to how a map may be printed out, dynamic map information, such as traffic conditions, require a connection to an external service provider which is not always available or affordable.

SUMMARY

Embodiments of the present invention disclose a method, system, and computer program product for GPS optimization without access to external traffic information providers. A computer detects the receipt of a destination and mode of transportation from a user. The computer determines potential routes to the destination using static map information and splits the routes into shorter lengths known as segments. The computer determines a commute time for each of the segments based on static map information, known as a static segment commute time, and determines whether any of the segments have been previously commuted by the user. If so, the computer replaces the static segment commute times with the segment commute times recorded during previous commutes of the segment, known as habitual segment commute times. The computer then determines the total commute time of each potential route based on the static and habitual segment commute times and records additional habitual segment statistics as the user commutes the selected route.

DETAILED DESCRIPTION

Embodiments of the present invention will now be described in detail with reference to the accompanying figures.

Figure 1:
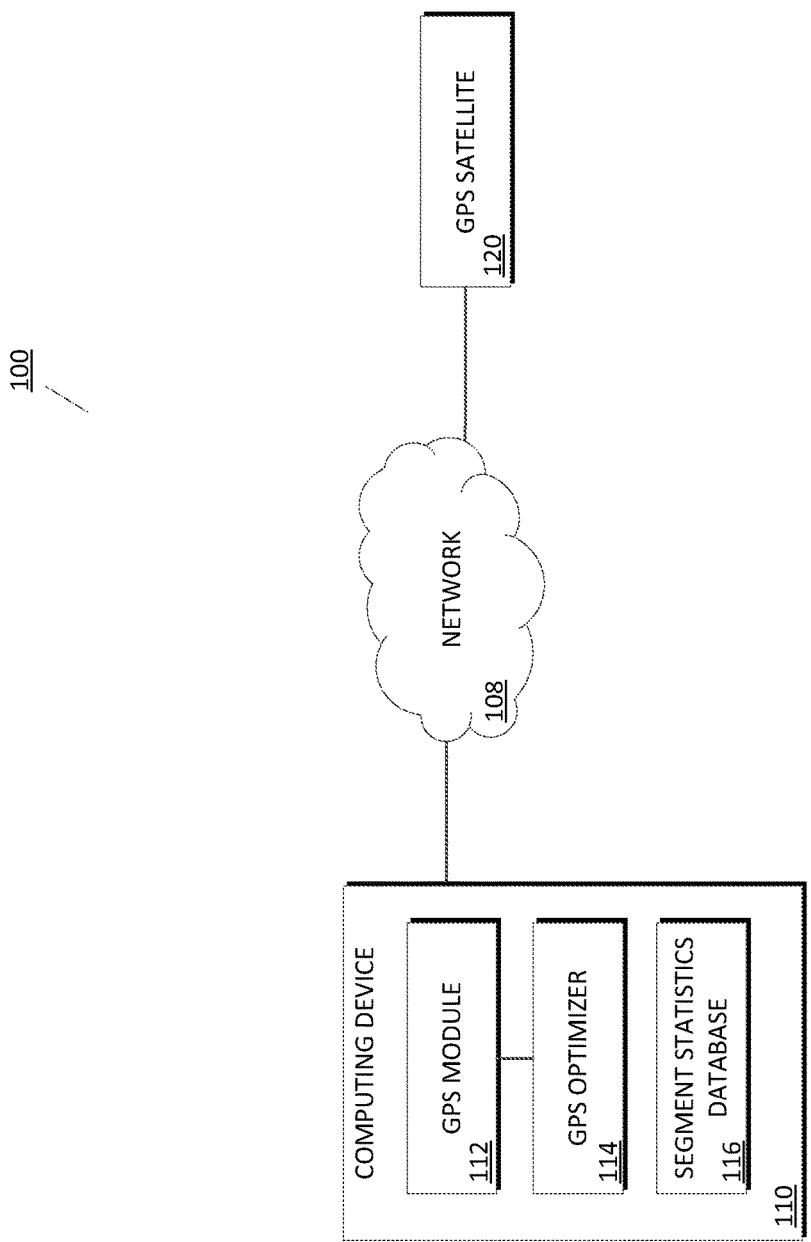
FIG. 1 illustrates GPS optimizing system 100, in accordance with an embodiment of the invention.

FIG. 1 illustrates a GPS optimizing system 100, in accordance with an embodiment of the invention. In the example embodiment, GPS optimizing system 100 includes network 108, computing device 110, and GPS satellite 120.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and other devices.

GPS satellite 120 is a satellite orbiting the earth which broadcasts a continuous signal detailing the identity of the satellite, the time of broadcast, and the location of the satellite at the time of broadcast. Four or more of these signals are picked up by GPS receivers, such as the GPS module 112, which then use the signal to determine the location of the GPS receiver. In the example embodiment, GPS module 112 communicates with GPS satellite 120 to determine the location of the user as the user commutes to and from locations.

In the example embodiment, computing device 110 includes GPS module 112, GPS optimizer 114, and segment statistics database 116. In the example embodiment, computing device 110 may be a laptop computer, a notebook, tablet computer, netbook computer, personal computer (PC), a desktop computer, a personal digital assistant (PDA), a smart phone, a thin module, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

In the example embodiment, GPS module 112 (software or hardware and software combination) is a program application on computing device 110 which communicates with a global position system to provide time and location information. Modern GPS systems, such as Google Maps® (Google Maps is a registered trademark of Google Incorporated) operate on the concept of time and location. In modern GPS systems, four or more satellites, such as GPS satellite 120, broadcast a continuous signal detailing satellite identification information, time of transmission (TOT), and the precise location of the satellite at the time of transmission. When a GPS receiver, such as GPS module 112, picks up the signal, GPS module 112 determines the difference in time between the time of transmission (TOT) and the time of arrival (TOA) at GPS module 112. Based on the amount of time it took to receive the signals and the precise locations of the satellites when the signals were sent, GPS receivers are capable of determining the location where the signals were received. In the example embodiment, GPS module 112 includes a map detailing streets/highways, speed limits, stop signs/lights, businesses, and other static information. However, in the example embodiment, GPS module 112 does not provide real-time traffic conditions or any other input from external service providers.

In the example embodiment, segment statistics database 116 is a collection of organized data detailing the commute statistics of segments making up previously driven routes. In the example embodiment, segment statistics database 116 includes statistics of factors ascertainable by utilizing locational and temporal information, such as time at segment begin, time at segment end, segment commute duration, maximum speed, minimum speed, average speed, time at a stand-still, day of the week, and date. In the example embodiment, segment statistics database 116 is stored locally on computing device 110, however in other embodiments, segment statistics database 116 may be stored remotely and access via network 108. Furthermore, in the example embodiment, segment statistics database is broken down by mode of transportation, such as driving, biking, walking, public transportation, etc., such that the statistics of factors for different types of transportation are distinguished from one another.

In the example embodiment, GPS optimizer 114 is a program on computing device 110 that is integrated with GPS module 112. In the example embodiment, GPS optimizer 114 is capable of receiving a destination and mode of transportation from a user as well as determining potential routes to the destination. GPS optimizer 114 is additionally capable of monitoring GPS module 112 for location information and measuring segment statistics of the current commute. GPS optimizer 114 is further capable of compiling the statistics in a new or existing route statistic entry contained in segment statistics database 116.

Figure 2:
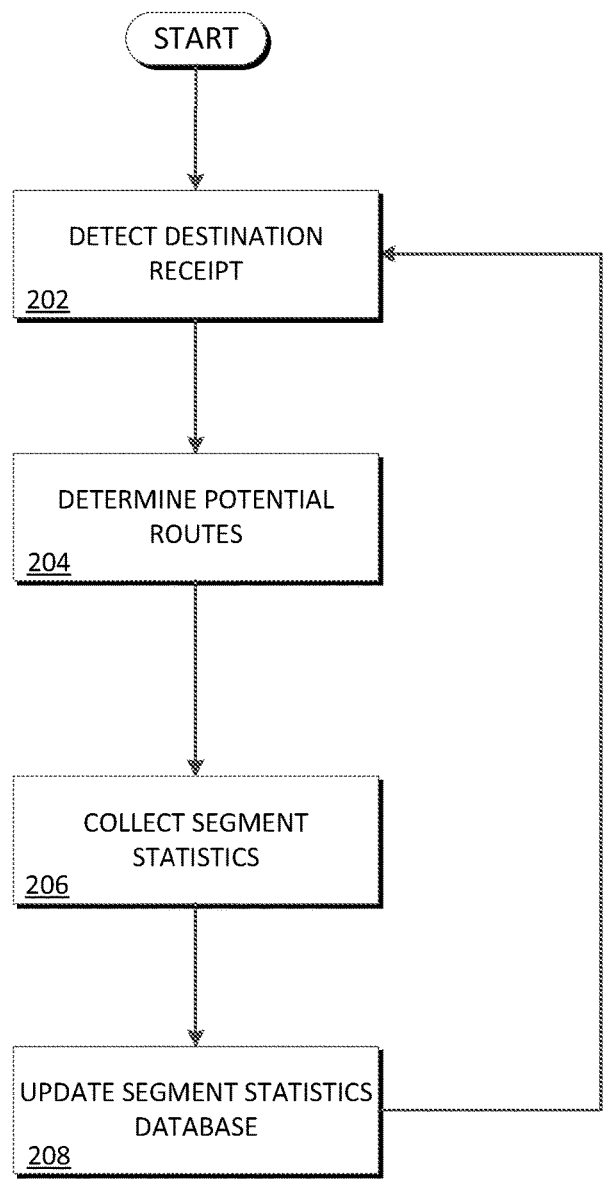
FIG. 2 is a flowchart illustrating the operations of GPS optimizer 114 of FIG. 1 in improving GPS navigation without access to external traffic information providers.

FIG. 2 is a flowchart depicting the operation of GPS optimizer 114 in recording detailed commute statistics and utilizing those statistics to determine an overall commute time to a destination.

GPS optimizer 114 detects that a user has entered a destination into GPS module 112 (step 202). In the example embodiment where GPS optimizer 114 is integrated with GPS module 112, GPS optimizer 114 detects the receipt of the destination from a user through the user interface of GPS module 112. In the example embodiment, GPS optimizer 114 is capable of receiving either an address or the name of a known business/building/landmark. Furthermore, GPS optimizer 114 additionally receives the mode of transportation selected by the user, such as driving, biking, walking, jogging, or taking public transportation. For example, if user Alpha would like to drive from his current location, P0, to his destination, P1, on a Monday at 3:00 PM, then the user enters P1 and selects an option indicating that he will drive into the user interface of GPS module 112.

GPS optimizer 114 determines potential routes to the destination by referencing GPS module 112 and, if applicable, a segment statistics database compiled by GPS optimizer 114 (step 204). In the example embodiment, GPS optimizer 114 determines overall route commute times by utilizing both map information provided by GPS module 112 as well as habitual statistics of previous commutes contained in segment statistics database 116. In the example embodiment, routes are broken down into segments of shorter lengths to increase applicability of existing, habitual statistics to future commutes (described in greater detail below). In order to estimate the overall route commute times, GPS optimizer 114 utilizes static statistics provided by GPS module 112, such as static segment commute times, as well as habitual statistics provided by segment statistics database 116, such as habitual segment commute times. In the example embodiment, the static statistics detail mileages, traffic signals, speed limits, and other static information corresponding to the route while the habitual statistics detail commute times, maximum speeds, minimum speeds, average speeds, time at a standstill, and other information corresponding to previous commutes of the routes by the user.

GPS optimizer 114 analyzes the streets and business detailed by GPS module 112 to identify both the destination and potential routes to the destination based on the user input received in step 202 (destination and mode of transport). GPS optimizer 114 then splits the potential routes into segments of shorter lengths, such as a block lengths or stretches of highway between consecutive exits. By splitting the routes into shorter segments, it is more likely that routes, and segments thereof, will overlap and existing, habitual segment statistics will be applicable to future commutes. Based on the segments comprising each route, GPS optimizer 114 estimates a static segment commute time for each segment of each potential route based on the mileages, speed limits, stop signs/lights, and other static information detailed by GPS module 112. Continuing the example above where user Alpha inputs driving to the destination P1 at 3:00 PM on a Monday, GPS optimizer 114 determines potential routes R1, R2, and R3 to the destination P1, splits each route into segments of city blocks (city) or the distance between highway exits (highway), and estimates static segment commute times for each segment making up each of the potential routes based on the mileage, speed limits, stop signs/lights, and streets/highways detailed by GPS module 112. In the example embodiment, potential routes are listed in ascending order of total route commute time (the sum of all the segment commute times per route).

GPS optimizer 114 then references segment statistics database 116 to determine whether any of the potential routes, or any segments thereof, have been previously commuted and contain existing, habitual segment statistics (step 204 continued). GPS optimizer 114 determines whether any of the routes or segments thereof have been previously commuted by determining whether the circumstances are similar in time, day, and date. For example, segment statistics for a segment in a school zone may vary significantly at 3:00 PM on a Sunday from 3:00 PM on a Wednesday. In order to determine whether circumstances are substantially similar enough to use the existing habitual statistics, GPS optimizer 114 goes through a four-prong test described in greater detail in step 208. If the circumstances are determined similar enough to utilize, GPS optimizer 114 retrieves the habitual segments statistics and incorporates the applicable information into the overall route commute times by replacing the static segment commute times with applicable habitual segment commute times. In the example embodiment, GPS optimizer 114 determines whether to incorporate the habitual segment statistics data into the potential routes by comparing the habitual segment statistics to the static segment statistics. In the example embodiment, GPS optimizer 114 is configured by a user to compare specific statistics, such as segment commute time, maximum speed, minimum speed, average speed, and time at a stand-still. For example, if the habitual segment commute time varies from the static segment commute time by greater than a user-set amount, for example, one minute, then GPS optimizer 114 adopts the habitual segment statistics and implements it into the overall route commute time of the route. Continuing the example above with user Alpha driving to P1 at 3:00 PM on a Monday, if the habitual segment commute time for segment S3 of route R1 on a Monday around 3:00 PM is five minutes and the static segment commute time for segment S3 is three minutes, then GPS optimizer 114 adopts the habitual segment commute time of five minutes and modifies the overall route commute time accordingly. In other embodiments, other tests may be administered to determine whether to adopt the habitual segment commute time or the static segment commute time, such as incorporating other factors detailed in segment statistics database 116. In further embodiments, GPS optimizer 114 may incorporate applicable habitual segment commute times into the potential routes upon existence of the habitual segment commute times and without administering any tests. Incorporating habitual segment statistics into the overall route commute time is advantageous because different people exhibit different driving, walking, and jogging habits. By utilizing real, habitual statistics of previous commutes, the habits (or traits) of each individual are incorporated into the commute to provide a custom overall route commute time for that particular user. Traits that may be incorporated may include scenarios where weight, heart, or other disabilities factor into the time it takes a user to get in/out of a vehicle, walk up/down a slope/staircase, or navigate other obstacles. In the example embodiment, GPS optimizer 114 considers such factors inherently because the more difficult/troublesome routes for a particular user will likely exhibit longer habitual segment commute times, more time at a standstill, etc. Therefore, such more troublesome/difficult routes and/or segments are unlikely be selected by GPS optimizer 114 as a potential route due to the increased commute time. If no previous segment statistics are applicable to the segments comprising the potential routes, GPS optimizer 114 determines the overall route commute time using the static segment commute times alone. After determining an overall route commute time for each of the routes based on the static segment statistics and habitual segment statistics, GPS optimizer 114 prompts the user to select one of the potential routes or decline to commute one of said routes.

GPS optimizer 114 collects habitual segment statistics of the current commute (step 206). In the example embodiment, GPS optimizer 114 splits the route into segments of block lengths during city routes and the distance between consecutive highway exit lengths during highway routes. In other embodiments, however, segment length may be defined by otherwise. GPS optimizer 114 collects habitual segment statistics by working in conjunction with GPS module 112 to gather locational and temporal information as the user commutes a route. In the example embodiment, GPS optimizer 114 begins collecting habitual segment statistics when GPS module 112 indicates that the user has changed location since selecting one of the potential routes. If GPS optimizer 114 determines through monitoring GPS module 112 that the user is deviating from the selected route, GPS optimizer 114 determines whether segments of the new route exist in segment statistics database 116 and, if not, creates a corresponding entry for the segments. For each individual segment, GPS optimizer 114 collects habitual information relevant to the commute conditions, such as time at segment begin, time at segment end, segment commute time, maximum speed, minimum speed, average speed, time at a stand-still, day of the week, and date. Continuing the example above where Alpha is driving to P1 on a Monday at 3:00 PM, if Alpha commutes route R1 made up of segments S1-S6, then GPS optimizing program 114 collects habitual segment statistics for each of segments S1 through S6.

When the user reaches the destination, GPS optimizer 114 updates segment statistics database 116 with the collected habitual segment statistics (step 208). Before compiling the recently collected and existing habitual segment statistics together, GPS optimizer 114 must first determine whether the two statistics are comparable, otherwise a new entry is created for the recently collected habitual segment statistics. For instance, the habitual segment statistics for a segment within a school zone may be significantly different on a Monday than on a Sunday. Thus, in the example embodiment, GPS optimizer 114 is configured to perform a four-part test to determine whether the recently collected, or current, habitual segment statistics are similar enough to the existing habitual segment statistics to compile together. In the example embodiment, GPS optimizer 114 first determines whether the segment statistics were collected at a substantially similar time of day by, for example, requiring the recently collected habitual statistics be taken within a time frame of the time of day that the existing habitual statistics were collected, such as one half hour (note that this determination excludes the hours between days). A first time of day is considered to be substantially similar to a second time of day if the first time of day is within a threshold period of time of the second time of day. For example, 3:00 PM on a Monday is a substantially similar time of day to 3:15 PM on Tuesday due to the first time of day (3:00 PM) being within a threshold period of time of the second time of day (3:15 PM). Continuing the example above where user Alpha is commuting segment S1 of route R1 at 3:00 PM on a Monday, if the existing habitual segment statistics for segment S1 were collected at 3:30 PM, then the recently collected habitual segment statistics for segment S1 pass the first prong of the four-part test because the time of day the statistics were collected are within a half hour of each other. If the recently collected habitual segment statistics pass the first prong of the four-part test, GPS optimizer 114 then determines whether the days the statistics were collected are similar, such as both being weekdays or weekends. Continuing the example above where user Alpha is commuting segment S1 of route R1 at 3:00 PM on a Monday, if the existing habitual segment statistics of segment S1 were collected on a Wednesday, then the recently collected segments statistics pass the second prong of the four-part test because the recently collected habitual segment statistics were similarly collected on a weekday (Monday). If the recently collected habitual segment statistics pass the second prong of the four-part test, then GPS optimizer 114 determines whether the dates the statistics were collected are comparable, such as both being a holiday or the date of a well-known event. Continuing the example above where user Alpha is commuting segment S1 of route R1 at 3:00 PM on a non-holiday Monday, if the existing habitual segment statistics were not collected on a holiday, then the recently collected habitual segment statistics pass the third prong of the fourth part test because the recently collected habitual statistics were not collected on a holiday. If the recently collected habitual segment statistics pass the third prong of the four-part test, GPS optimizer 114 determines whether the recently collected habitual segment statistics are within a user-set percentage of the existing habitual segment statistics, such as twenty percent. Continuing the example above where user Alpha is commuting segment S1 of route R1 at 3:00 PM on a Monday, if the recently collected habitual segment statistics of segment S1 details a habitual segment commute time of 5 minutes and the existing habitual segment statistics of S1 details a habitual segment commute time of 6 minutes, then the recently collected habitual segment statistics pass the fourth prong of the four-part test because the recently collected habitual segment statistics of S1 are within twenty percent of the existing habitual segment statistics of S1. In the example embodiment, if the recently collected and existing habitual segment statistics satisfy each prong of the four-part test, then the segments are considered similar and the habitual statistics are combined. If the recently collected habitual segment statistics fail any prongs of the four-part test, the user is notified and may select to override the rejection to compile the habitual statistics anyway, create a new entry corresponding to the time/day/date of the non-comparable collected segment statistics, or disregard/discard the collected segment statistics. In other embodiments, if the recently collected habitual segment statistics fail any prong of the test, GPS optimizer 114 creates a new entry corresponding to the time/day/date of the non-comparable collected segment statistics without notifying the user. In further embodiments, if the recently collected habitual segment statistics fail any prong of the test, GPS optimizer 114 discards the collected segment statistics without notifying the user. Additionally, the test to determine whether the habitual statistics are similar enough to compile together may be configured differently. In even further embodiments, exponential moving averages and regression techniques can be used to incorporate the recently collected habitual segment statistics with the existing habitual segment statistics. For example, if the recently collected habitual segment statistics which were collected at 3:00 PM detail a segment commute time of 5:00 minutes and it is known that the traffic at 4:00 PM is roughly double the traffic at 3:00 PM, then GPS optimizer 114 utilizes exponential moving averages and regression techniques to determine an existing habitual segment commute time of 10:00 minutes at 4:00 PM.

Figure 3:
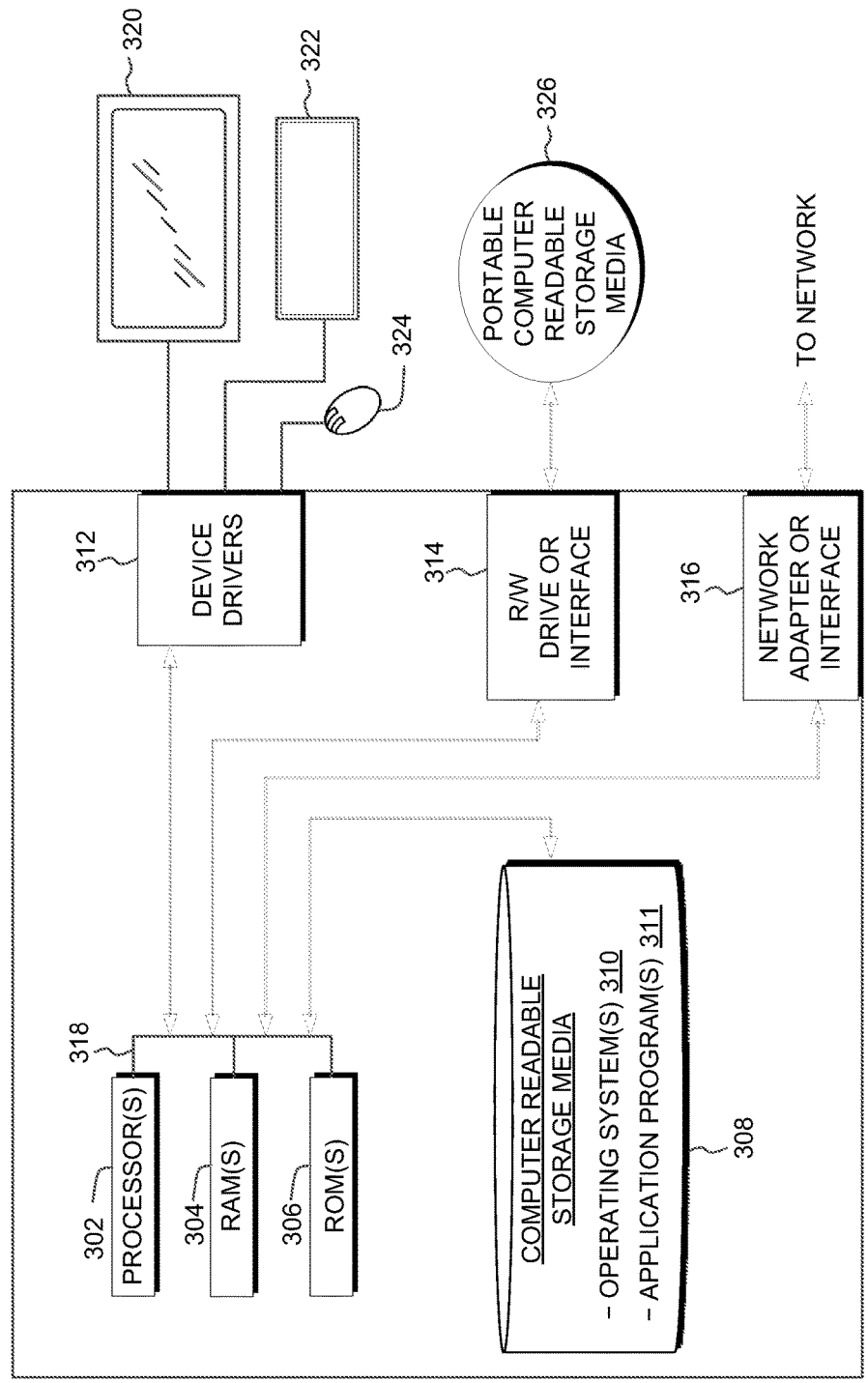
FIG. 3 is a block diagram depicting the hardware components of GPS optimizing system 100 of FIG. 1, in accordance with an embodiment of the invention.

FIG. 3 depicts a block diagram of components of computing device 110 of GPS optimizing system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, GPS optimizer 114, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for GPS optimization, the method comprising:
    determining one or more potential routes between a location of a user and a destination;
    splitting at least one of the one or more potential routes into one or more segments;
    determining one or more static segment commute times associated with at least one of the one or more segments based on static segment statistics, wherein the static segment statistics detail at least one of: (i) a mileage of the one or more segments, (ii) one or more speed limits corresponding to the one or more segments, and (iii) one or more traffic signals corresponding to the one or more segments;
    determining whether habitual segment statistics are applicable to a time of driving at least one of the one or more segments, wherein the habitual segment statistics include information detailing previous commutes of the one or more segments by the user including at least one of: (i) a time at segment begin, (ii) a time at segment end, (iii) an overall segment commute time, (iv) a maximum speed, (v) a minimum speed, (vi) an average speed, (vii) an amount of time at a stand-still, (viii) a day of the week, and (ix) a date, and wherein determining that habitual segment statistics are applicable to at least one of the one or more segments requires:
        determining that the habitual segment statistics correspond to a time of day that is within a threshold time period of a time of day at which the user is commuting the one or more potential routes;
        determining that the habitual segment statistics correspond to a same day of the week as a day of the week at which the user is commuting the one or more potential routes;
        determining that the habitual segment statistics correspond to a same holiday as a holiday at which the user commuting the one or more potential routes; and
        determining that the habitual segment statistics are within a threshold percentage of the static segment statistics;
    based on determining that habitual segment statistics are applicable to at least one of the one or more segments, determining one or more habitual segment commute times for the at least one of the one or more segments based on the habitual segment statistics of the at least one of the one or more segments;

determining whether a deviation of the one or more habitual segment commute times from the one or more static segment commute times exceeds a threshold amount;

based on determining that the deviation of the one or more habitual segment commute times from the one or more static segment commute times exceeds the threshold amount; replacing the one or more static segment commute times associated with the at least one of the one or more segments with the determined one or more habitual segment commute times associated with the at least one of the one or more segments; and determining an overall commute time for the at least one of the one or more potential routes based on at least one of: (i) at least one of the one or more of the static segment commute times associated with the at least one of the one or more segments and (ii) at least one of the one or more determined habitual segment commute times associated with the at least one of the one or more segments, wherein one or more steps of the above method are performed using one or more computers.

2. The method of claim 1, further comprising:
collecting current habitual segment statistics corresponding to the one or more segments as the one or more segments are commuted by the user; and
updating a segment statistics database based on comparing the current habitual segment statistics with the habitual segment statistics.

3. The method of claim 1, wherein the one or more segments are at least one of: one or more city blocks along the one or more potential routes and one or more stretches of highway between consecutive exits along the one or more potential routes.

4. The method of claim 1, further comprising:
collecting current habitual segment statistics corresponding to the one or more segments as the one or more segments are commuted by the user; and
updating a segment statistics database based on applying exponential moving averages and regression techniques to the current habitual segment statistics.

5. The method of claim 1, wherein the one or more potential routes details at least one of: a driving route, a cycling route, a walking route, a jogging route, and a public transportation route.

6. A computer program product for GPS optimization, the computer program product comprising:
one or more computer-readable non-transitory storage media and program instructions stored on the one or more computer-readable storage media, the program instructions comprising:
program instructions to determine one or more potential routes between a location of a user and a destination;
program instructions to split at least one of the one or more potential routes into one or more segments;
program instructions to determine one or more static segment commute times associated with at least one of the one or more segments based on static segment statistics, wherein the static segment statistics detail at least one of: (i) a mileage of the one or more segments, (ii) one or more speed limits corresponding to the one or more segments, and (iii) one or more traffic signals corresponding to the one or more segments;

program instructions to determine whether habitual segment statistics are applicable to a time of driving at least one of the one or more segments, wherein the habitual segment statistics include information detailing previous commutes of the one or more segments by the user including at least one of: (i) a time at segment begin, (ii) a time at segment end, (iii) an overall segment commute time, (iv) a maximum speed, (v) a minimum speed, (vi) an average speed, (vii) an amount of time at a stand-still, (viii) a day of the week, and (ix) a date, and wherein the program instructions to determine that habitual segment statistics are applicable to at least one of the one or more segments requires:
program instructions to determine that the habitual segment statistics correspond to a time of day that is within a threshold time period of a time of day at which the user is commuting the one or more potential routes;
program instructions to determine that the habitual segment statistics correspond to a same day of the week as a day of the week at which the user is commuting the one or more potential routes;
program instructions to determine that the habitual segment statistics correspond to a same holiday as a holiday at which the user commuting the one or more potential routes; and
program instructions to determine that the habitual segment statistics are within a threshold percentage of the static segment statistics;

based on determining that habitual segment statistics are applicable to at least one of the one or more segments, program instructions to determine one or more habitual segment commute times for the at least one of the one or more segments based on the habitual segment statistics of the at least one of the one or more segments;

program instructions to determine whether a deviation of the one or more habitual segment commute times from the one or more static segment commute times exceeds a threshold amount;

based on determining that the deviation of the one or more habitual segment commute times from the one or more static segment commute times exceeds the threshold amount; program instructions to replace the one or more static segment commute times associated with the at least one of the one or more segments with the determined one or more habitual segment commute times associated with the at least one of the one or more segments; and program instructions to determine an overall commute time for the at least one of the one or more potential routes based on at least one of: (i) at least one of the one or more of the static segment commute times associated with the at least one of the one or more segments and (ii) at least one of the one or more determined habitual segment commute times associated with the at least one of the one or more segments.

7. The computer program product of claim 6, further comprising:
program instructions to collect current habitual segment statistics corresponding to the one or more segments as the one or more segments are commuted by the user; and
program instructions to update a segment statistics database based on comparing the current habitual segment statistics with the habitual segment statistics.

8. The computer program product of claim 6, wherein the one or more segments are at least one of: one or more city blocks along the one or more potential routes and one or more stretches of highway between consecutive exits along the one or more potential routes.

9. The computer program product of claim 6, further comprising:
program instructions to collect current habitual segment statistics corresponding to the one or more segments as the one or more segments are commuted by the user; and
program instructions to update a segment statistics database based on applying exponential moving averages and regression techniques to the current habitual segment statistics.

10. The computer program product of claim 6, wherein the one or more potential routes details at least one of: a driving route, a cycling route, a walking route, a jogging route, and a public transportation route.

11. A computer system for GPS optimization, the computer system comprising:
one or more computer processors, one or more computer-readable storage media, and program instructions stored on one or more of the computer-readable storage media for execution by at least one of the one or more processors, the program instructions comprising:
program instructions to determine one or more potential routes between a location of a user and a destination;
program instructions to split at least one of the one or more potential routes into one or more segments;
program instructions to determine one or more static segment commute times associated with at least one of the one or more segments based on static segment statistics, wherein the static segment statistics detail at least one of: (i) a mileage of the one or more segments, (ii) one or more speed limits corresponding to the one or more segments, and (iii) one or more traffic signals corresponding to the one or more segments;
program instructions to determine whether habitual segment statistics are applicable to a time of driving at least one of the one or more segments, wherein the habitual segment statistics include information detailing previous commutes of the one or more segments by the user including at least one of: (i) a time at segment begin, (ii) a time at segment end, (iii) an overall segment commute time, (iv) a maximum speed, (v) a minimum speed, (vi) an average speed, (vii) an amount of time at a stand-still, (viii) a day of the week, and (ix) a date, and wherein the program instructions to determine that habitual segment statistics are applicable to at least one of the one or more segments requires:
program instructions to determine that the habitual segment statistics correspond to a time of day that is within a threshold time period of a time of day at which the user is commuting the one or more potential routes;
program instructions to determine that the habitual segment statistics correspond to a same day of the week as a day of the week at which the user is commuting the one or more potential routes;
program instructions to determine that the habitual segment statistics correspond to a same holiday as a holiday at which the user commuting the one or more potential routes; and
program instructions to determine that the habitual segment statistics are within a threshold percentage of the static segment statistics;
based on determining that habitual segment statistics are applicable to at least one of the one or more segments, program instructions to determine one or more habitual segment commute times for the at least one of the one or more segments based on the habitual segment statistics of the at least one of the one or more segments;
program instructions to determine whether a deviation of the one or more habitual segment commute times from the one or more static segment commute times exceeds a threshold amount;
based on determining that the deviation of the one or more habitual segment commute times from the one or more static segment commute times exceeds the threshold amount; program instructions to replace the one or more static segment commute times associated with the at least one of the one or more segments with the determined one or more habitual segment commute times associated with the at least one of the one or more segments; and
program instructions to determine an overall commute time for the at least one of the one or more potential routes based on at least one of: (i) at least one of the one or more of the static segment commute times associated with the at least one of the one or more segments and (ii) at least one of the one or more determined habitual segment commute times associated with the at least one of the one or more segments.

12. The computer system of claim 11, further comprising:
program instructions to collect current habitual segment statistics corresponding to the one or more segments as the one or more segments are commuted by the user; and
program instructions to update a segment statistics database based on comparing the current habitual segment statistics with the habitual segment statistics.

13. The computer system of claim 11, wherein the one or more segments are at least one of: one or more city blocks along the one or more potential routes and one or more stretches of highway between consecutive exits along the one or more potential routes.

14. The computer system of claim 11, further comprising:
program instructions to collect current habitual segment statistics corresponding to the one or more segments as the one or more segments are commuted by the user; and
program instructions to update a segment statistics database based on applying exponential moving averages and regression techniques to the current habitual segment statistics.

15. The computer system of claim 11, wherein the one or more potential routes details at least one of: a driving route, a cycling route, a walking route, a jogging route, and a public transportation route.

* * * * *